(12) United States Patent
Hughes

(10) Patent No.: US 8,012,375 B2
(45) Date of Patent: Sep. 6, 2011

(54) TEMPERATURE INDICATING PAINT

(75) Inventor: Michael Hughes, Swansea (GB)

(73) Assignee: Rolls-Royce PLC, London (GB)

( * ) Notice: Subject to any disclaimer, the term of this patent is extended or adjusted under 35 U.S.C. 154(b) by 902 days.

(21) Appl. No.: 12/000,868

(22) Filed: Dec. 18, 2007

(65) Prior Publication Data

US 2010/0276642 A1  Nov. 4, 2010

(30) Foreign Application Priority Data

Jan. 10, 2007  (GB) .................................. 0700396.5

(51) Int. Cl.
*G01N 31/22* (2006.01)

(52) U.S. Cl. ..................... 252/408.1; 116/207; 106/400; 106/403; 106/404; 106/480

(58) Field of Classification Search ............. 252/408.01, 252/408.1; 116/207; 106/400, 403, 404, 106/480
See application file for complete search history.

(56) References Cited

U.S. PATENT DOCUMENTS

| | | | | |
|---|---|---|---|---|
| 5,759,256 | A * | 6/1998 | Stramel ......................... | 106/439 |
| 6,682,665 | B2 * | 1/2004 | Watson ....................... | 252/408.1 |
| 6,864,096 | B2 * | 3/2005 | Watson et al. .................. | 436/84 |

FOREIGN PATENT DOCUMENTS

| | | |
|---|---|---|
| EP | 1 288 266 A1 | 3/2003 |
| EP | 1 447 431 A1 | 8/2004 |
| EP | 1 614 724 A2 | 1/2006 |
| GB | 1103059 | 2/1967 |
| GB | 2 204 874 A | 11/1988 |

* cited by examiner

*Primary Examiner* — Jill Warden
*Assistant Examiner* — Monique Cole
(74) *Attorney, Agent, or Firm* — Oliff & Berridge, PLC

(57) ABSTRACT

A temperature indicating paint comprises 4 wt % to 40 wt % sodium alumino sulpho silicate, 1 wt % to 38 wt % nickel antimony titanate and the binder comprises 25 wt % to 50 wt % silicone resin 10 wt % to 30 wt % acrylic resin each excluding solvent. This composition undergoes color changes occur, these are; Blue 520-560° C.; Light Blue 950-990° C.; Light Yellow 1000-1040° C.; Glazed Black 1160-1200° C. The color changes are particularly distinct and enable accurate analysis particularly, but not exclusively, in gas turbine engines.

19 Claims, No Drawings

TEMPERATURE INDICATING PAINT

The present invention relates to an irreversible temperature indicating paint.

Irreversible temperature indicating paint changes colour at one or more known temperatures. These colour changes indicate the temperature to which different parts of the component or components have been subjected. The final colour of the irreversible temperature indicating paint is dependent on both the temperature it is subjected to and the time period over which it is held at a raised temperature.

The irreversible temperature paint is applied to a component in a test situation and subsequently analysed to determine the temperatures to which different regions of the component reached during the test. Irreversible temperature indicating paints thus produce a temperature profile over the whole surface of the component, rather than discreet points, if for example thermocouples are used.

Irreversible temperature indicating paints are applied to components, for example turbine blades, turbine vanes and combustor of gas turbine engines. These engines are run at the normal operating conditions.

One known temperature indicating paint described in our UK patent GB1103059 comprises principally of lead chromate, magnesium carbonate, and silica Another known temperature indicating paint, described in our UK patent GB2204874 comprises one or more of silver, gold, platinum, copper; nickel, chromium, titanium and silicon dispersed in 10 to 70 wt % solvent and resin.

Rolls-Royce plc employ a number of proprietary thermal paints to detect surface metal temperatures by irreversible chemical/physical changes in the paint, giving colour and/or texture changes.

For example TP16 (Thermal Paint 16) has both colour and texture based change points at the following temperatures, based on a 3 minute calibration:

| Code | Colour | Change points based on a 3 Minute calibration (° C.) |
|---|---|---|
| a | LIGHT BLUE | 440 |
| b | DARK BLUE | 630 |
| c | MIDNIGHT BLUE | 660 |
| d | MATT BLACK | 680 |
| e | BLACK GLAZE | 700 |

The existing range of thermal paints generate a large number of change points at specific temperatures. Each change point equates to a single isotherm or temperature measurement and each paint may contain one or more change points.

Currently there are areas of temperature measurement not supported by the thermal paint temperature capability. This is being solved through the development of new thermal paints.

A number of the colour changes of the change points over this thermal paint range are very difficult to distinguish between because of the similar colours generated by the paint. An example of this is between change points a, b and c within TP16, changing from light Blue to dark blue to midnight blue.

These colour changes reduce the accuracy of the data generated during hand reading or borescope analysis, due to the difficulty of distinguishing between the similar coloured change points.

Accordingly the present invention seeks to provide a novel irreversible temperature indicating paint that has a plurality of relatively bright colour changes and preferably in the temperature range 500° C. to 1400° C.

In accordance with the present invention there is provided an irreversible temperature indicating paint comprising a binder and a solvent characterised in that the irreversible temperature indication paint comprises sodium alumino sulpho silicate and nickel antimony titanate.

Normally, the irreversible temperature indicating paint comprises 4 wt % to 40 wt % sodium alumino sulpho silicate, 1 wt % to 38 wt % nickel antimony titanate excluding solvent.

Preferably, the irreversible temperature indicating paint as comprises 31 wt % to 40 wt % sodium alumino sulpho silicate, 1 wt % to 11 wt % nickel antimony titanate excluding solvent.

More preferably, the irreversible temperature indicating paint comprises 37 wt % to 40 wt % sodium alumino sulpho silicate, 2 wt % to 5 wt % nickel antimony titanate excluding solvent.

An ideal irreversible temperature indicating paint comprises 38.2 wt % sodium alumino sulpho silicate, 2.1 wt % nickel antimony titanate excluding solvent.

Normally, the binder comprises 20 wt % to 50 wt % silicone resin 10 wt % to 30 wt % acrylic resin excluding solvent.

Preferably, the binder comprises 20 wt % to 30 wt % silicone resin 15 wt % to 25 wt % acrylic resin excluding solvent.

More preferably, the binder comprises 35 wt % to 40 wt % silicone resin 18 wt % to 22 wt % acrylic resin excluding solvent.

Ideally, the binder comprises 38.7 wt % silicone resin 20.9 wt % acrylic resin excluding solvent.

Normally, the weight of the solvent is between 20% to 45% of the other constituents.

Preferably, the weight of the solvent is between 30% to 40% of the other constituents.

More preferably, the weight of the solvent is 35% of the other constituents.

Normally, the solvent comprises a mixture of propylene glycol ethers and preferably the mixture is 80% 1-methoxy-2-propanol and 20% dipropylene glycol monomethyl ether.

The present invention will be more fully described by way of example.

An irreversible temperature indicating paint (herein referred to as MC54) according to the present invention has three or more colour changes in the temperature range 500° C. to 1400° C. when run at maximum operating conditions of a gas turbine MC54 engine, or other engine, for about 3 minutes.

When MC54 is exposed to key temperatures irreversible chemical/physical changes occur within the paint, giving colour and/or texture changes.

The irreversible temperature indicating paint MC54 comprises sodium alumino sulpho silicate, nickel antimony titanate, a binder and a solvent. The binder preferably comprises acrylic resin and silicone resin; however, other binders may be apparent to the skilled person and may be interposed without departing from the scope of the present invention. The solvent allows the paint to remain fluid and flow until dry, when the solvent will have evaporated.

The main features of MC54 are the colour changes that the change points generate. For a gas turbine engine turbine blade, the main temperature changes of interest are between 1000° C. and 1200° C., where the paint changes from light blue to light yellow at 1020° C. and from light yellow to black at 1180° C. Because these colour changes are contrasting the regions of the blade subject to these temperatures can be easily identified during borescope analysis. Such accurate knowledge of thermal contours helps to verify computer models, to life limit components or to see where additional cooling should be directed.

In particular and for the preferred composition of MC54, when used on a turbine blade or vane, the change points occur at the following temperatures based on a 3 minute calibration: Blue 540° C.; Light Blue 970° C.; Light Yellow 1020° C.; Glazed Black 1180° C. For the broader ranges of compositions stated below there is a corresponding temperature range within which the colour changes occur, these are; Blue 520-560° C.; Light Blue 950-990° C.; Light Yellow 1000-1040° C.; Glazed Black 1160-1200° C. However, these broader ranges of compositions cause the edges of the temperature regions, and therefore the colour change areas, to be more indistinct than the preferred embodiment.

Note that these colour changes occur in the specified temperature ranges based on a 3 minute exposure time and that with less exposure the temperature ranges for colour change will increase and with greater exposure the temperature ranges will decrease the colour change points.

It has been found that the preferred composition of MC54 comprises 38.2 wt % sodium alumino sulpho silicate, 2.1 wt % nickel antimony titanate, a binder comprising 38.7 wt % silicone resin 20.9 wt % acrylic resin each percentage by weight excluding the weight of solvent. A suitably workable paint also includes a solvent weight of the 35% of the other constituents.

The broadest known range for MC54 to realise its distinctive colour change advantages comprises 4 wt % to 40 wt % sodium alumino sulpho silicate, 1 wt % to 38 wt % nickel antimony titanate and the binder comprises 20 wt % to 50 wt % silicone resin 10 wt % to 30 wt % acrylic resin each excluding solvent.

Where borescope techniques are used or other difficult to view situations are present, constituents of MC54 may be in the ranges 31 wt % to 40 wt % sodium alumino sulpho silicate, 1 wt % to 11 wt % nickel antimony titanate and the binder comprising 20 wt % to 30 wt % silicone resin 15 wt % to 25 wt % acrylic resin, each excluding solvent.

The optimum range of constituents, particularly for use of gas turbine engine components, comprises 37 wt % to 40 wt % sodium alumino sulpho silicate, 2 wt % to 5 wt % nickel antimony titanate and the binder comprises 35 wt % to 40 wt % silicone resin 18 wt % to 22 wt % acrylic resin, again each excluding solvent.

For most applications a suitable range of solvent comprises a weight between 20% and 45% of the other constituents. For certain gas turbine engine components a solvent weight between 30% and 40% of the other constituents is ideal.

Although other solvents may be used the Applicant has found that a mixture of propylene glycol ethers is suitable and preferably the solvent comprises a mixture of 80% 1-methoxy-2-propanol and 20% dipropylene glycol monomethyl ether.

The irreversible temperature indicating paint is applied to turbine blades or turbine vanes or other components of gas turbine engines. The irreversible temperature indicating paint is used to determine the temperatures to which various parts of the turbine blade, turbine vane or other component are subjected in operation of the gas turbine engine.

The irreversible temperature indicating paint may be used on components in other engines or other machines or other apparatus to determine the temperature to which various parts of the component are subjected in operation.

The advantage of the irreversible temperature indicating paint of the present invention is that it has temperature indicating colour change that are more distinct and therefore are more easily detected and analysed.

I claim:

1. An irreversible temperature indicating paint comprising a binder, a solvent and a temperature indicating composition consisting of sodium alumino sulpho silicate and nickel antimony titanate.

2. An irreversible temperature indicating paint as claimed in claim 1 comprising 4 wt % to 40 wt % sodium alumino sulpho silicate, 1 wt % to 38 wt % nickel antimony titanate excluding solvent.

3. An irreversible temperature indicating paint as claimed in claim 1 comprising 31 wt % to 40 wt % sodium alumino sulpho silicate, 1 wt % to 11 wt % nickel antimony titanate excluding solvent.

4. An irreversible temperature indicating paint as claimed in claim 1 comprising 37 wt % to 40 wt % sodium alumino sulpho silicate, 2 wt % to 5 wt % nickel antimony titanate excluding solvent.

5. An irreversible temperature indicating paint as claimed in claim 1 comprising 38.2 wt % sodium alumino sulpho silicate, 2.1 wt % nickel antimony titanate excluding solvent.

6. An irreversible temperature indicating paint as claimed in claim 1 wherein the binder comprises 20 wt % to 50 wt % silicone resin 10 wt % to 30 wt % acrylic resin excluding solvent.

7. An irreversible temperature indicating paint as claimed in claim 1 wherein the binder comprises 20 wt % to 30 wt % silicone resin 15 wt % to 25 wt % acrylic resin excluding solvent.

8. An irreversible temperature indicating paint as claimed in claim 1 wherein the binder comprises 35 wt % to 40 wt % silicone resin 18 wt % to 22 wt % acrylic resin excluding solvent.

9. An irreversible temperature indicating paint as claimed in claim 1 wherein the binder comprises 38.7 wt % silicone resin 20.9 wt % acrylic resin excluding solvent.

10. An irreversible temperature indicating paint as claimed in claim 1 wherein the weight of the solvent is between 20% to 45% of the other constituents.

11. An irreversible temperature indicating paint as claimed in claim 1 wherein the weight of the solvent is between 30% to 40% of the other constituents.

12. An irreversible temperature indicating paint as claimed in claim 1 wherein the weight of the solvent is 35% of the other constituents.

13. An irreversible temperature indicating paint as claimed in claim 1 wherein the solvent comprises a mixture of propylene glycol ethers.

14. An irreversible temperature indicating paint as claimed in claim 13 wherein the solvent comprises a mixture of 80% 1-methoxy-2-propanol and 20% dipropylene glycol monomethyl ether.

15. An irreversible temperature indicating paint as claimed in claim 1 wherein the paint has a first color change temperature in the range 520-560° C.

16. An irreversible temperature indicating paint as claimed in claim 1 wherein the paint has a second color change temperature in the range 950-990° C.

17. An irreversible temperature indicating paint as claimed in claim 1 wherein the paint has a third color change temperature in the range 1000-1040° C.

18. An irreversible temperature indicating paint as claimed in claim 1 wherein the paint has a fourth color change temperature in the range 1160-1200° C.

19. An irreversible temperature indicating paint as claimed in claim 1 wherein the paint has color changes temperature in the ranges blue 520-560° C.; light blue 950-990° C.; light yellow 1000-1040° C.; glazed black 1160-1200° C.

* * * * *